United States Patent
Noe

[11] 3,766,679
[45] Oct. 23, 1973

[54] FISH HOOK SETTER
[75] Inventor: Max E. Noe, Des Moines, Iowa
[73] Assignee: The Raymond Lee Organization, Inc., New York, N.Y.
[22] Filed: Dec. 21, 1971
[21] Appl. No.: 210,503

[52] U.S. Cl. .................................................. 43/15
[51] Int. Cl. ............................................ A01k 97/00
[58] Field of Search ......................................... 43/15

[56] References Cited
UNITED STATES PATENTS
3,314,185   4/1967   McCoy et al. ........................... 43/15
1,383,474   7/1921   Lucas ...................................... 43/15

Primary Examiner—Louis G. Mancene
Assistant Examiner—Daniel J. Leach
Attorney—Daniel Jay Tick

[57] ABSTRACT

A fish hook setter comprising a tubular housing having means at one end for fixing the housing to a fishing pole, an elongated flat tongue slidably positioned in the housing with a portion of the tongue extending outside the housing, and spring means disposed in the housing for applying specific tensions to a fishing line attached to the outer end of the tongue. The spring means is attached at one end to the inner end of the tongue and at the other end to the housing. Tension maintaining means for holding the tongue at different lengths outside of the housing comprises a plurality of spaced holes in the tongue and a leaf spring affixed at one end to the outside of the housing with the other end extending beyond the end of the housing and having a bent part to engage a selected hole in the tongue. When a fish bits, the bent part of the leaf spring is disengaged from the hole in the tongue and the spring means retracts the tongue into the housing to set the hook on the line in the fish's mouth.

1 Claim, 4 Drawing Figures

Patented Oct. 23, 1973 3,766,679

FISH HOOK SETTER

The invention relates to a fish hook setter. More particularly, the invention relates to a fish hook setter for selectively tensioning a fish hook affixed to a fishing line relative to a fishing pole and abruptly applying the tension force when a fish bites on the hook.

An object of the invention is to provide a fish hook setter of simple structure which functions with efficiency, effectiveness and reliability.

Another object of the invention is to provide a fish hook setter which applies selected specific tensions to a fishing line and maintaining such tensions on the line until the tension is released by a fish bite on the fish hook.

In order that the invention may be readily carried into effect, it will now be described with reference to the accompanying drawing, wherein.

In the FIGS., the same components are identified by the same reference numerals.

Figure 1:
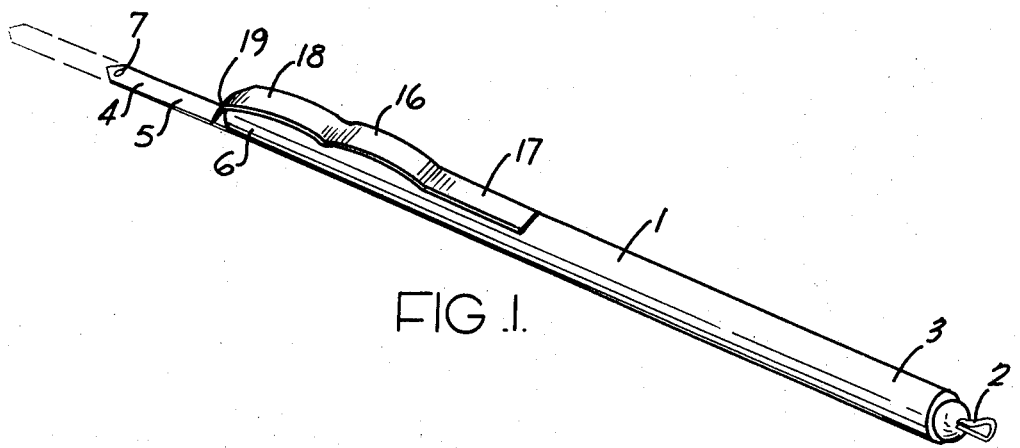
FIG. 1 is a perspective view of an embodiment of the fish hook setter of the invention.

A housing 1 is of substantially axially elongated configuration. The housing 1 has a coupling loop 2 at one axial end 3 thereof (FIG. 1) for fixing said housing to a fishing pole (not shown in the FIGS.).

An elongated tongue 4 is substantially coaxially slidably positioned in the housing 1. The tongue 4 has a portion 5 extending outside the housing 1 at the end 6 of said housing. The tongue 4 has a coupling hole 7 (FIGS. 1, 2 and 3) formed therethrough at the end 8 thereof outside the housing 1 for fixing said tongue to a fishing line (not shown in the FIGS.).

Figure 4:
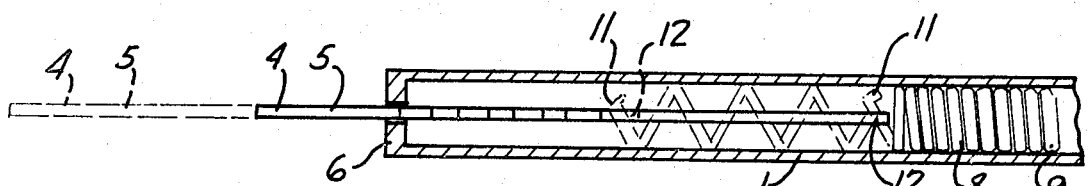
FIG. 4 is a sectional view of the fish hook setter of FIGS. 1, 2 and 3.

Tensioning means, hereinafter described, applies selected specific tensions to the fishing line via the tongue 4 and maintains such tensions on the fishing line until the tension is released by a fish bite on a fish hook affixed to the free end of the fishing line. The tensioning means comprises a coil spring 8 of substantially helically configuration (FIG. 4). The spring 8 is a compression spring and is positioned in the housing 1 with one end 9 thereof affixed to the housing. The spring 8 is affixed at the other end 11 to the end 12 of the tongue 4 inside said housing. The spring 8 applies a spring force urging the tongue 4 into the housing 1.

The tensioning means further comprises tension maintaining means hereinafter described for holding part of the tongue 4 at selected different lengths outside the housing 1 against specific corresponding spring forces. The tension maintaining means is releasable to release the tongue 4 to the force of the spring 8 when said tongue is jiggled by a fish (not shown in the FIGS.) biting on the fish hook (not shown in the FIGS.).

The tension maintaining means comprises catch means on the tongue 4 spaced along its axial length and comprising a plurality of equidistantly spaced holes 13, 14, 15, and so on (FIGS. 2 and 3) formed through said tongue. A substantially elongated leaf spring 16 is affixed at one end 17 to the outside of the housing 1 and extends substantially parallel to the axis of said housing.

Figure 2:
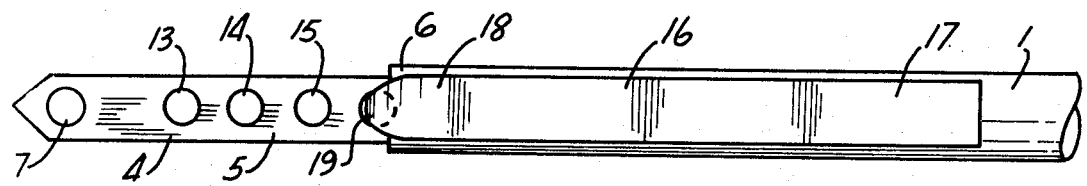
FIG. 2 is a top view of the fish hook setter of the embodiment of FIG. 1.
Figure 3:
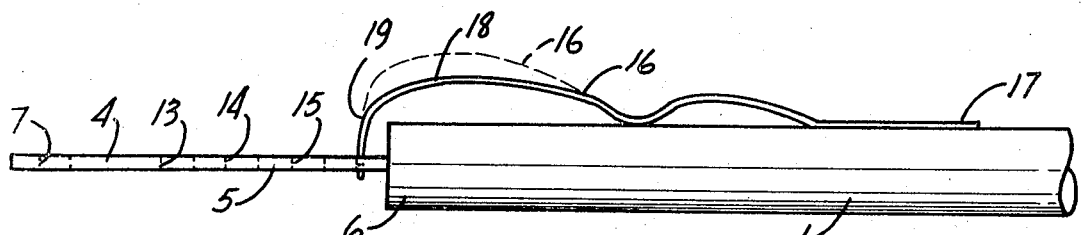
FIG. 3 is a side view of the fish hook setter of FIGS. 1 and 2.

The other end 18 of the leaf spring 16 has a bent part 19 extending beyond the end 6 of the housing 1 into operative proximity with the holes 13, 14, 15, and so on, of the tongue 4 for selective manual engagement with a desired one of said holes, as shown in FIGS. 1, 2, and 3. The bent part 19 of the leaf spring 16 comprises a point adapted to fit into a selected one of the holes through the tongue 4, as shown in FIG. 3.

In operation, the loop 2 of the housing 1 is tied by the fisherman to the end of the fishing pole and the fishing line is tied through the hole 7 of the tongue 4. The fisherman then pulls out the tongue 4 to provide the desired tension. Thus, for example, for a small fish, he pulls the tongue 4 two or three holes out of the housing 1, and pushes the point 19 of the leaf spring 16 into the selected hole. For larger fish, the fisherman pulls the tongue 4 eight, nine or ten holes out of the housing 1.

When a fish bites on the hook at the end of the fishing line, the line is jiggled and jiggles the tongue 4 so that the point 19 of the leaf spring 16 is moved out of its hole and releases the tension on the line. The fish is hooked before he can escape. Unattended fishing poles will catch fish the same way as attended poles. After the fish is hooked there is continuous spring tension on the hook, due to the spring force of the spring 8, and the fish cannot escape.

While the invention has been described by means of specific examples and in specific embodiments, I do not wish to be limited thereto, for obvious modifications will occur to those skilled in the art without departing from the spirit and scope of the invention.

I claim:

1. A fish hook setter for selectively tensioning a fish hook affixed to a fishing line relative to a fishing pole and abruptly applying the tension force when a fish bites on the hook, said fish hook setter comprising a housing of substantially axially elongated configuration having coupling means at one axial end thereof for fixing the housing to a fishing pole;

an elongated substantially flat tongue substantially coaxially slidably positioned in the housing and having a portion thereof extending outside the housing at one end thereof and coupling means at the end thereof outside the housing for fixing the tongue to the fishing line; and tensioning means for applying selected specific tensions to the fishing line via the tongue and maintaining such tensions on the fishing line until the tension is released by a fish bite on the hook, the tensioning means including spring means in the housing affixed at one end to the housing and affixed at the other end to the end of the tongue inside the housing thereby applying a spring force urging the tongue into the housing and tension maintaining means for holding part of the tongue at selected different lengths outside the housing against specific corresponding applied spring forces, the tension maintaining means being releasable to release the tongue to the force of the spring means when the tongue is jiggled by a fish biting on the fish hook, the tension maintaining means of the tensioning means comprises catch means on the tongue spaced along its axial length and a substantially elongated leaf spring affixed at one end to the outside of the housing, extending substantially parallel to the axis of the housing and having at its other end a bent part extending beyond the end of the housing into operative proximity with the catch means of the tongue for selective manual engagement with a desired one of the catch means, the catch means of the tongue comprising a plurality of holes formed through the tongue and the bent part of the leaf spring comprising a point adapted to fit into a selected one of the holes through the tongue.

* * * * *